(12) United States Patent
Gao

(10) Patent No.: US 8,428,627 B2
(45) Date of Patent: Apr. 23, 2013

(54) METHOD AND SYSTEM FOR MEDIA MODIFICATION

(75) Inventor: Yang Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/389,962

(22) PCT Filed: May 24, 2010

(86) PCT No.: PCT/CN2010/073160
§ 371 (c)(1),
(2), (4) Date: Feb. 10, 2012

(87) PCT Pub. No.: WO2011/035601
PCT Pub. Date: Mar. 31, 2011

(65) Prior Publication Data
US 2012/0172069 A1    Jul. 5, 2012

(30) Foreign Application Priority Data
Sep. 23, 2009    (CN) .......................... 2009 1 0093943

(51) Int. Cl.
*H04W 4/20* (2009.01)
(52) U.S. Cl.
USPC ............................. 455/466; 709/217; 370/310
(58) Field of Classification Search ................. 455/466, 455/404.1, 450; 709/217, 231; 370/310, 370/328, 259
See application file for complete search history.

(56) References Cited

FOREIGN PATENT DOCUMENTS

| CN | 101374138 A | 2/2009 |
| WO | 2008082203 A1 | 7/2008 |

OTHER PUBLICATIONS

SIP WG, Integration of Resource Management and SIP, Internet Engineering Task Force, INTERNET-DRAFT, Draft-ietf-sip-manyfolks-resource-07.ps.
3GPP TSG CT WG3, Policy and Charging Control over Rx reference point (Release9), 3GPP TS 29.214 v9.0.0 (May 2009).
International Search Report for PCT/CN2010/073160 dated Jul. 2, 2010.

*Primary Examiner* — Phuoc Doan
(74) *Attorney, Agent, or Firm* — Ling Wu; Stephen Yang; Ling and Yang Intellectual Property

(57) ABSTRACT

The present invention discloses a method and system for media modification, which is used for solving the problem that it is not considered during media modification whether the user confirmation or precondition of media modification is required, thereby resulting in technical defects, such as possible bearing resource embezzlement, producing redundancy, etc. The present invention regards the 200OK message of Re-INVITE as the confirmed time point of the media addition and/or modification; in the case that there is a precondition and the user confirmation is not required, the time point when the precondition is satisfied is regarded as the confirmed time point of the media component addition and/or existing media component modification; in the case that there is a precondition and the user confirmation is required, the 200OK response message of the Re-INVITE message is regarded as the confirmed time point of the media component addition and/or existing media component modification.

8 Claims, 3 Drawing Sheets

METHOD AND SYSTEM FOR MEDIA MODIFICATION

TECHNICAL FIELD

The present invention relates to the field of mobile communication, and in particular, to a method and system for media modification with a precondition in the 3rd generation partnership project (3GPP).

BACKGROUND OF THE RELATED ART

The current 3GPP protocol provides that after entering the call status, the bearing control function, after receiving the 200OK confirmation message of the UPDATE message, starts the threshold control of the grouping classifier, that is, makes the media modification and switching operation become effective.

Referring to FIG. 1, the calling party and the called party modifies the media through the Re-INVITE transaction, and the bearing control function, when receiving the confirmation message (200 OK) of the UPDATE message, makes the media modification and switching effective, and the following problems exist:

1, considering the precondition, at this time the resource reservation of a certain direction is possibly not completed yet, and when the resource is not available, it is set to be effective prematurely;

2, the called user may require the manual confirmation for the media modification and switching operation, and before the user confirmation, it is set to be effective prematurely, and in the case that the user rejects it, many subsequent redundant steps will be produced.

3, the media channel is opened before the 200OK of the Re-INVITE message is confirmed, and the user may embezzle the bearing resource.

Therefore, the 200OK confirmation message of the UPDATE message during the Re-INVITE transaction process is unable to act as the confirmation of the media modification and switching.

At the same time, the case of the multimedia stream is considered, such as the audio stream modification coding and decoding format, and at the same time the video stream is added. The video stream may require the user confirmation, therefore, its bearing control function can regard the 200OK of the Re-INVITE as the final confirmation; however, the user, after completing the first media offer/answer process in the Re-INVITE, can possibly start using the new audio coding and decoding, therefore setting the effectiveness of the new parameter of the audio stream should not be delayed after receiving the 200OK confirmation message of the Re-INVITE.

SUMMARY OF THE INVENTION

In view of this, the main purpose of the present invention is to provide a method and system for media modification, which is used for solving the problem in the existing technology that it is not considered during media modification whether the user confirmation or precondition of media modification is required, thereby resulting in technical defects, such as possible bearing resource embezzlement, producing redundant steps, etc.

In order to achieve the above purpose, the technical scheme of the present invention is realized as follows:

a method for media modification, comprising:

when a Re-INVITE message initiates a media component addition and/or existing media component modification, if there is a precondition for the media component addition and/or the existing media component modification and a user confirmation is not required for the media component addition and/or the existing media component modification, then regarding a time point when the precondition is satisfied as a confirmed time point of the media component addition and/or the existing media component modification; and if there is a precondition for the media component addition and/or the existing media component modification and the user confirmation is required for the media component addition and/or the existing media component modification, then regarding a 200OK response message of the Re-INVITE message as the confirmed time point of the media component addition and/or the existing media component modification, Furthermore, the method further comprises:

if there is no precondition for the media component addition and/or the existing media. component modification, and the user confirmation is not required for the media component addition and/or the existing media component modification, then regarding a time point when one media offer/answer process is completed as the confirmed time point of the media component addition and/or the existing media component modification.

Furthermore, the confirmed time point of the media component addition and/or the existing media component modification refers to a time point when sending an AA-Request/AA-Answer message to a bearing control function, thereby triggering the bearing control function to start a grouping classifier.

Based on the above method, the present invention further provides a system for media negotiation, comprising a first terminal, a second terminal, a proxy-call session control function (P-CSCF) and a policy and charging rule function (PCRF), wherein, based on the system, when the first terminal initiates a media component addition and/or existing media component modification through a Re-INVITE message, if there is a precondition for the media component addition and/or the existing media component modification and a confirmation of the first terminal and the second terminal is not required for the media component addition and/or the existing media component modification, then a time point when the precondition is satisfied is regarded as a confirmed time point of the media component addition and/or the existing media component modification;

if there is a precondition for the media component addition and/or the existing media component modification and the confirmation of the first terminal and the second terminal is required for the media component addition and/or the existing media component modification, then a 200OK response message of the Re-INVITE message is regarded as the confirmed time point of the media component addition and/or the existing media component modification.

Based on the system, furthermore, if there is no precondition for the media component addition and/or the existing media component modification, and a user confirmation is not required for the media component addition and/or the existing media component modification, then a time point when one media offer/answer process is completed is regarded as the confirmed time point of the media component addition and/or the existing media component modification.

Based on the system, furthermore, the confirmed time point of the media component addition and/or the existing media component modification refers to a time point when sending an AA-Request/AA-Answer message to a bearing control function, thereby triggering the bearing control function to start a grouping classifier.

The present invention modifies the triggering time point for submitting the media modification operation. For an added media, the 200OK message of the Re-INVITE is regarded as the confirmed time point for the media being added; when the existing media is modified, and in the case that there is no precondition, the time point when one media offer/answer is completed is regarded as the confirmed time point for the media modification, and in the case that there is a precondition, the time point when the precondition is satisfied is regarded as the confirmed time point fur the media modification. By the present invention, a premature confirmation of the modification can be avoided before the resource is available or before the user confirmation, and thereby the bearing resource embezzlement and producing unnecessary redundant steps are prevented.

PREFERRED EMBODIMENTS OF THE PRESENT INVENTION

The core idea of the present invention is that for an added media, a 200OK response message of an UPDATE message in a Re-INVITE transaction process is not regarded as a confirmed time point for media modification, while the 200OK response message of the Re-INVITE message or a time point when the precondition is satisfied or a time point when one media offer/answer process is completed is regarded as the confirmed time point for the media modification. When existing media is modified, the 200OK response message of the UPDATE message in the Re-INVITE transaction process is not regarded as the confirmed time point for the media modification, while the time point when the precondition is satisfied or the time point when one media offer/answer process is completed is regarded as the confirmed time point for the media modification.

The precondition described by the present invention refers to, in a media negotiation process, the precondition included in the media attribute in the media description protocol, of which the definition refers to RFC3312 and RFC4032.

One media offer/answer described by the present invention is the first media offer and media answer occurred in the process of media modification triggered by the Re-INVITE message.

The confirmed time point for the media modification described by the present invention refers to a time point that sending an AA-Request (AAR)/AA-Answer (AAA) message to a bearing control function, thereby triggering the bearing control function to start a grouping classifier.

The media modification of the present invention includes the cases, such as the addition of media component and/or the modification of existing media component, etc. In one media modification process, various media components may be aimed at, and the confirmed time points of addition and/or modification of different media components can be different.

In order to make the purpose, the technical scheme and the advantage of the present invention more clear, the present invention is further described in detail with reference to the accompanying drawings and in combination with embodiments hereinafter.

Figure 1:
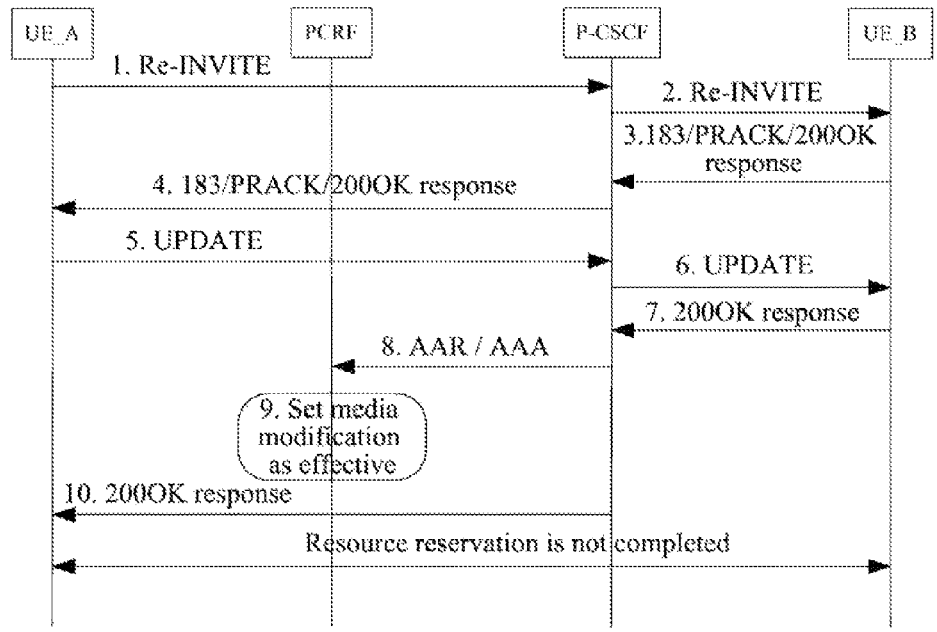
FIG. 1 is a media switching flow chart of the media modification and switching operation being confirmed prematurely in the related art.
Figure 2A:
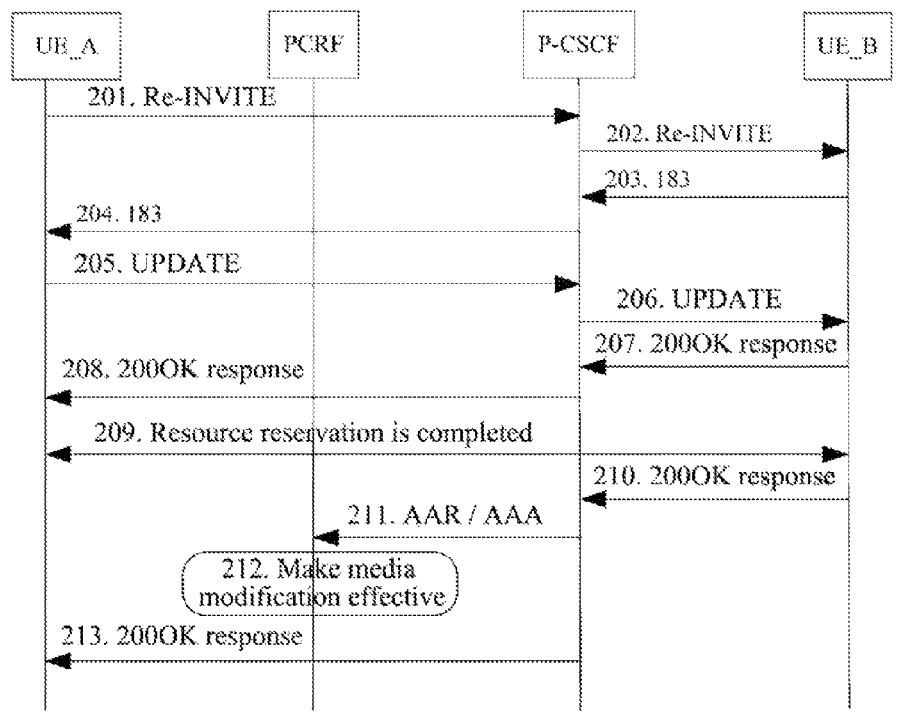
FIG. 2A is a flow chart of a process in which a user confirmation is required and there is a precondition when a media component is added or modified according to the present invention.

Embodiment 1:

FIG. 2A is a flow chart of a process in which a user confirmation of the addition of media component and/or modification of existing media component is required and there is a precondition when adding a new media component or modifies an existing media component in the present invention, the specific steps of which are as follows:

step 201, a calling terminal UE_A sends a Re-INVITE message to a proxy-call session control function (P-CSCF) as a request of media component addition or media component modification;

in the present invention, a process from sending the Re-INVITE message to receiving the 200OK response message of the Re-INVITE message is called one Re-INVITE transaction.

Step 202, the P-CSCF forwards the request of media component addition or media component modification to the called terminal UE_B;

step 203-204, the called terminal, through the forwarding of P-CSCF, replies a 183 response message (PRACK/200OK is omitted in the figure to the calling terminal;

step 205-206, the calling terminal, due to some reason, for example when receiving a precondition status notification, sends an UPDATE message to the P-CSCF, and the P-CSCF forwards it to the called terminal;

in that step, the precondition is related to the resource reservation, and the status notification is a status notification for the resource reservation, and the specific status notification message is related to the used resource reservation protocol.

Step 207-208, the called terminal UE_B sends the 200OK response message of the UPDATE message to the P-CSCF, and the P-CSCF forwards that message to the calling terminal UE_A.

Since in that embodiment there is a precondition fur the media component addition or the media component modification, in the present invention, after the called terminal sends the 200OK response message of the UPDATE to the P-CSCF, the process that the P-CSCF starts the grouping classifier of the bearing control function will not be triggered.

Step 209, the media resource reservation process aiming at the media component addition or the media component modification is performed between UE_A and UE_B;

step 210, the called terminal UE_B sends the 200OK response message of the Re-INVITE to the P-CSCF;

step 211, the P-CSCF, after receiving the 200OK response message of the Re-INVITE, sends the AAR/AAA message indicating the confirmation of media modification to the policy and charging rule function (PCRF);

step 212, the PCRF starts the threshold control of the grouping classifier, and makes the operations of media component addition or media component modification become effective;

step 213, the P-CSCF forwards the 200OK response message of the Re-INVITE to the calling terminal.

In that embodiment, the 200OK response message of the UPDATE is not regarded as the triggering time point of the media component addition or the media component modification becoming effective, while after the precondition of the media component addition or the media component modification is satisfied, the 200OK response message of the Re-INVITE is regarded as the triggering time point, and in this way, prematurely submitting the media modification before the resource reservation is completed can be effectively avoided.

Figure 2B:
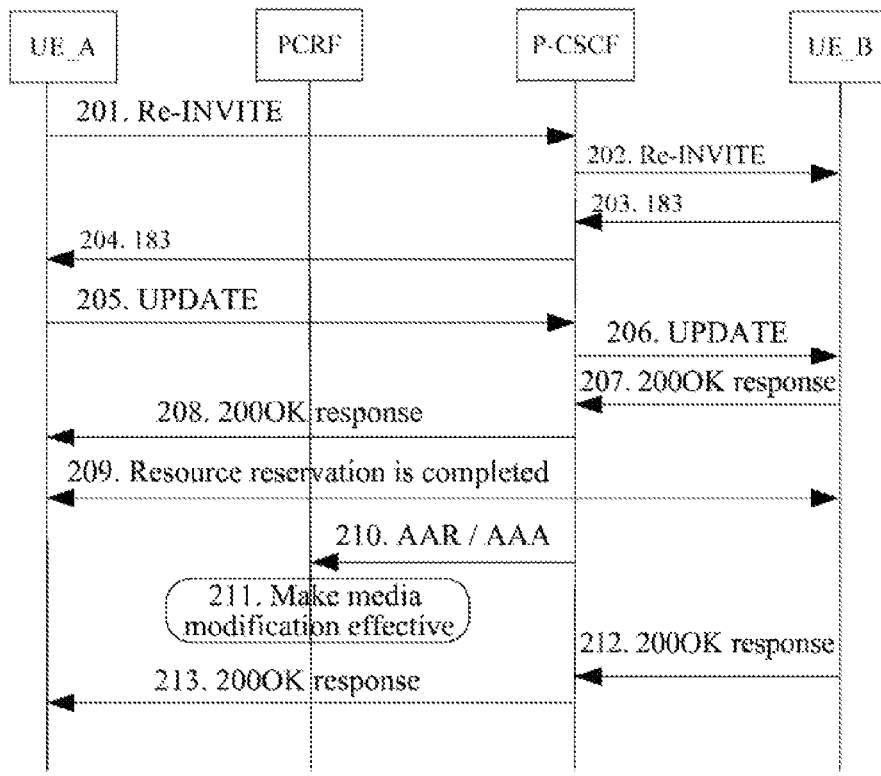
FIG. 2B is a flow chart of a process in which a user confirmation is not required and there is a precondition when a media component is added or modified according to the present invention.

Embodiment 2:

FIG. 2B is a flow chart of a process in the case that a user confirmation is not required for the addition of media component or modification of media component and there is a precondition when adding a media component or modifying an existing media component according to the present invention. In that embodiment, the calling terminal UE_A sends the Re-INVITE message to the P-CSCF as a request of media component addition or media component modification; wherein step 201 to step 208 are similar to FIG. 2A, while the difference from FIG. 2A is when the precondition is satisfied (if the precondition is related to the resource reservation, then the corresponding resource reservation is completed), that is, after step 209 is completed, the P-CSCF sends an AAR/AAA message directly to the PCRF without waiting for the 200OK response message of the Re-INVITE of the called terminal.

In the present embodiment, when adding the media component or modifying the existing media component, no user confirmation is required for the addition of media component or the modification of media component; however, in the case that there is a precondition, the time point when the precondition is satisfied is regarded as the confirmed time point of the media modification, which avoids the premature confirmation of the modification before the resource is available, thereby the bearing resource embezzlement and producing unnecessary redundant steps are prevented.

Figure 2C:
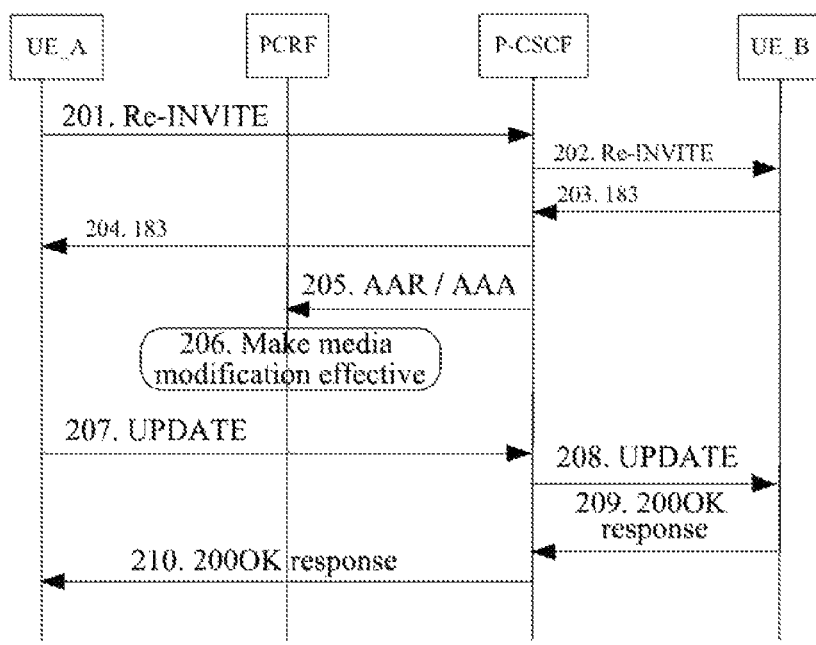
FIG. 2C is a flow chart of a process in which a user confirmation is not required and there is no precondition when a media component is added or modified according to the present invention.

Embodiment 3:

FIG. 2C is a flow chart of a process in the case that a user confirmation is not required for the addition of media component or the modification of media component and there is no precondition when a media component is added or an existing media component is modified in the present invention. In that embodiment, the calling terminal UE_A sends the Re-INVITE message to the P-CSCF as a request of media component addition or media component modification. Since no user confirmation is required and there is no precondition aiming at the media component addition or modification, after that embodiment completes one whole media offer and media answer, the P-CSCF sends the AAR/AAA message directly to the PCRF, in order to make the media component addition or the media component modification effective, and there may be subsequent steps like 207-210, etc.

In the present embodiment, when adding the media component or modifying the existing media component, in the case that no user confirmation is required for the addition of media. component or the modification of media component and there is no precondition, the time point, when one media offer/answer process is completed, is regarded as the confirmed time point of the media modification, thereby producing unnecessary redundant steps is prevented.

Embodiment 4:

In the case of multi-media stream, it is possible that the existing media component is also modified when adding the media component and the addition of media component may also require the user manual confirmation. For the modification of existing media component, the terminal equipment may start using a new media parameter just after completing one media offer/answer process in the Re-INVITE transaction (the Re-INVITE transaction may include multiple media offer/answer processes) or the precondition is satisfied, such as new audio coding and decoding. In order to ensure the continuity of the existing media stream, the new parameter in the bearing channel is required to be activated when the new media parameter is available or the user has already used the new media parameter. Therefore, the present invention confirms the modification of existing media stream and the addition of media stream respectively through two steps.

Figure 3:
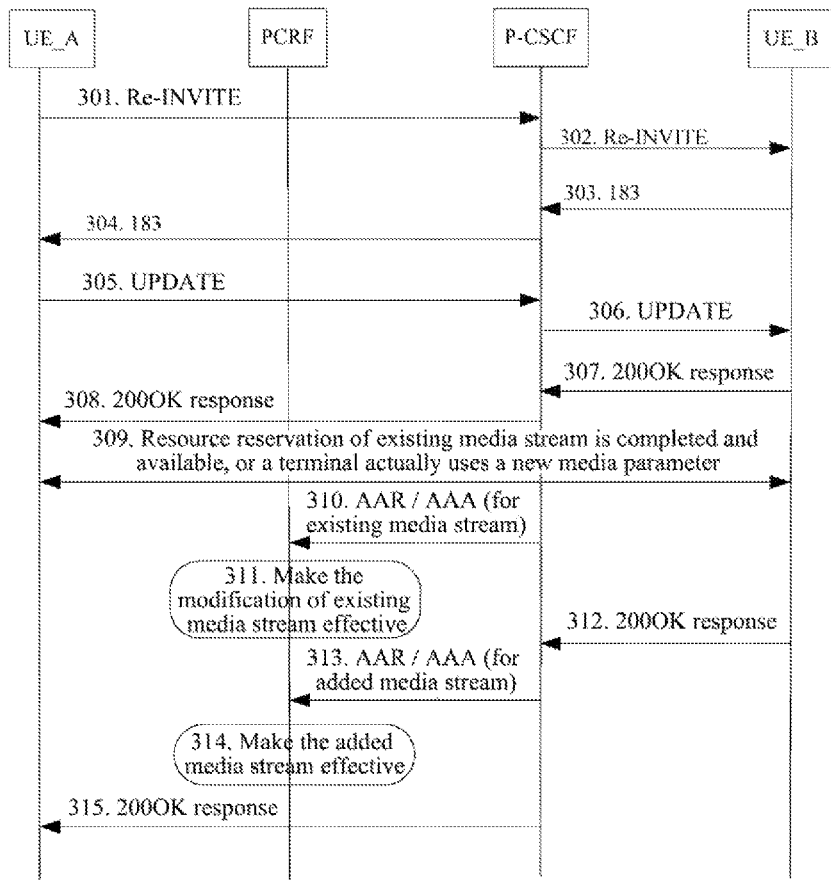
FIG. 3 is a flow chart of a process in a case that adding and modifying media component exist at the same time according to the present invention.

FIG. 3 is a flow chart of a process in a case that adding a media component and modifying an existing media component at the same time in the present invention, of which the specific steps are as follows:

step 301, a calling terminal UE_A sends a Re-INVITE message to a P-CSCF to request adding the media;

step 302, the P-CSCE forwards the Re-INVITE message to the called terminal UE_B;

step 303-304, the called terminal, through forwarding of P-CSCF, replies the 183 response message (PRACK/200 OK is omitted in the figure) to the calling terminal;

step 305-306, the calling terminal, due to some reason, for example when receiving a precondition status notification, sends an UPDATE message to the P-CSCF to request modifying the existing media component parameter, and the P-CSCF forwards it to the called terminal;

step 307-308, the called terminal UE_B sends the 200OK confirmation response message of the UPDATE message to the P-CSCF, and the P-CSCF forwards that message to the calling terminal UE_A.

In that embodiment, the confirmed time point of the media component addition or media component modification is not triggered for the 200OK response message of the UPDATE, that is, it is not triggered that the P-CSCF sends the AAR/AAA message to the PCRF.

Step 309, the resource reservation of the existing media component is completed and available, or the calling and called users have already used the new media parameter;

step 310, for the existing media component, the P-CSCE sends the AAR/AAA message to the PCRF, and triggers the process that the PCRF makes the existing media component modification effective and submits it;

step 311, for the existing media component, the modification of existing media component is submitted and made effective;

step 312, the called terminal sends the 200OK response message of the Re-INVITE to the P-CSCF;

step 313, after receiving the 200OK response message of the Re-INVITE, for the addition of media component, the P-CSCE sends the AAR/AAA message to the PCRF and triggers the process that the PCRF makes the addition of media component effective;

step 314, the PCRF makes the addition of media component effective and submits it;

in that embodiment, for the modification of existing media stream, the 200OK response message of the UPDATE message is not regarded as the confirmed time point when the modification is made effective, and the time point when the precondition is satisfied is regarded as the confirmed time point when the modification is made effective, which avoids prematurely confirming the modification before the resource is available; for the addition of media stream, since the user manual confirmation may also be required, after the precondition is satisfied and the calling and called terminals have already confirmed the addition of media stream, that is, the time point when receiving the 200OK response message of the Re-INVITE is regarded as the time point when the addition of media component is made effective, which thereby avoids prematurely confirming the addition of media before the resource is available and thereby prevents the bearing resource embezzlement.

The above description is only the preferred embodiments of the present invention and is not intended to limit the protection scope of the present invention.

What is claimed is:

1. A method for media modification, comprising:
when a Re-INVITE message initiates a media component addition and/or existing media component modification, if there is a precondition for the media component addition and/or the existing media component modification and a user confirmation is not required for the media component addition and/or the existing media component modification, then regarding a time point when the precondition is satisfied as a confirmed time point of the media component addition and/or the existing media component modification;
if there is a precondition for the media component addition and/or the existing media component modification and the user confirmation is required for the media component addition and/or the existing media component modification, then regarding a 200OK response message of the Re-INVITE message as the confirmed time point of the media component addition and/or the existing media component modification.

2. The method according to claim 1, further comprising:
if there is no precondition for the media component addition and/or the existing media component modification, and the user confirmation is not required for the media component addition and/or the existing media component modification, then regarding a time point when one media offer/answer process is completed as the confirmed time point of the media component addition and/or the existing media component modification.

3. The method according to claim 1, wherein, the confirmed time point of the media component addition and/or the existing media component modification refers to a time point when sending an AA-Request/AA-Answer message to a bearing control function, thereby triggering the bearing control function to start a grouping classifier.

4. The method according to claim 2, wherein, the confirmed time point of the media component addition and/or the existing media component modification refers to a time point when sending an AA-Request/AA-Answer message to a bearing control function, thereby triggering the bearing control function to start a grouping classifier.

5. A system for media negotiation, comprising a first terminal, a second terminal, a proxy-call session control function (P-CSCF) and a policy and charging rule function (PCRF), characterized in that,
when the first terminal initiates a media component addition and/or existing media component modification through a Re-INVITE message, if there is a precondition for the media component addition and/or the existing media component modification and a confirmation of the first terminal and the second terminal is not required for the media component addition and/or the existing media component modification, then a time point when the precondition is satisfied is regarded as a confirmed time point of the media component addition and/or the existing media component modification;
if there is a precondition for the media component addition and/or the existing media component modification and the confirmation of the first terminal and the second terminal is required for the media component addition and/or the existing media component modification, then a 200OK response message of Re-INVITE message is regarded as the confirmed time point of the media component addition and/or the existing media component modification.

6. The system according to claim 5, wherein,
if there is no precondition for the media component addition and/or the existing media component modification and a user confirmation is not required for the media component addition and/or the existing media component modification, then a time point when one media offer/answer process is completed is regarded as the confirmed time point of the media component addition and/or the existing media component modification.

7. The system according to claim 5, wherein, the confirmed time point of the media component addition and/or the existing media component modification refers to a time point when sending an AA-Request/AA-Answer message to a bearing control function, thereby triggering the bearing control function to start a grouping classifier.

8. The system according to claim 6, wherein, the confirmed time point of the media component addition and/or the existing media component modification refers to a time point when sending an AA-Request/AA-Answer message to a bearing control function, thereby triggering the bearing control function to start a grouping classifier.

* * * * *